US006041265A

United States Patent [19]

Suzuki et al.

[11] Patent Number: 6,041,265

[45] **Date of Patent: *Mar. 21, 2000**

[54] OPERATIONAL CONTROL DEVICE AND METHOD FOR AN IMAGE PROCESSING APPARATUS

[75] Inventors: Akio Suzuki, Tokyo; Ei Yamamoto; Toshiyuki Kitamura, both of Yokohama; Hiroyoshi Yoshida, Fujisawa, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/404,563

[22] Filed: Mar. 15, 1995

[30] Foreign Application Priority Data

Mar. 16, 1994 [JP] Japan .................................... 6-045897

[51] Int. Cl.[7] ...................................................... G05B 19/00

[52] U.S. Cl. ................................. 700/84; 700/83; 355/32

[58] Field of Search .................................... 364/189, 188; 358/503, 516, 537, 518, 515, 98, 296; 345/33, 326, 431, 965, 966; 355/32, 88

[56] References Cited

U.S. PATENT DOCUMENTS

| | | | |
|---|---|---|---|
| 4,096,523 | 6/1978 | Belmares-Sarabia et al. | 358/80 |
| 4,831,437 | 5/1989 | Nishioka et al. | 358/98 |
| 5,208,903 | 5/1993 | Curry | 395/131 |
| 5,369,733 | 11/1994 | Arimoto et al. | 395/100 |
| 5,459,589 | 10/1995 | Ohnishi et al. | 358/518 |
| 5,493,408 | 2/1996 | Kurogane et al. | 358/296 |

FOREIGN PATENT DOCUMENTS

WO82/01083 4/1982 WIPO .

OTHER PUBLICATIONS

Daniel Smith, "Closing the Color Loop", Umiach Catalog V128 N39, 26c–27c, Aug. 30, 1995.

*Primary Examiner*—Paul P. Gordon
*Attorney, Agent, or Firm*—Fitzpatrick, Cella, Harper & Scinto

[57] ABSTRACT

An operational control device of an image processing apparatus displays set color-balance settings on the corresponding keys with the corresponding figures and bar graphs. It also displays the title of a color-balance setting, as required. This facilitates the confirmation of set processing conditions in storing plural processing conditions for image processing, and also facilitates the selection of stored processing conditions to read. When a magnification is specified in the XY zoom mode, the key indicating that the mode has been specified is displayed. Pressing this key displays the XY zoom setting screen again. This facilitates the confirmation and change of set processing conditions.

11 Claims, 14 Drawing Sheets

Select a Zoom Functions feature.
XY ZOOM
ZOOM PROGRAM
MULTI-PAGE ENLARGEMENT
IMAGE COMBINATION
C
OK
Ready to copy
100%
AUTO PAPER SELECTION
DIRECT
R
E
ZOOM
ACS
BLACK
401
402
403
404
405
406

Enter the copy ratio(s) (25 - 400%)
X [ 86% ]
Y [ 115% ]
NUMERIC KEY ENTRY
407
408
409
410

Enter the X and Y copy ratio(s) with the numeric keys. (25 - 400%)
+/– KEY ENTRY
412
413
414

Ready to copy
X 85%
Y 115%
XY ZOOM
411

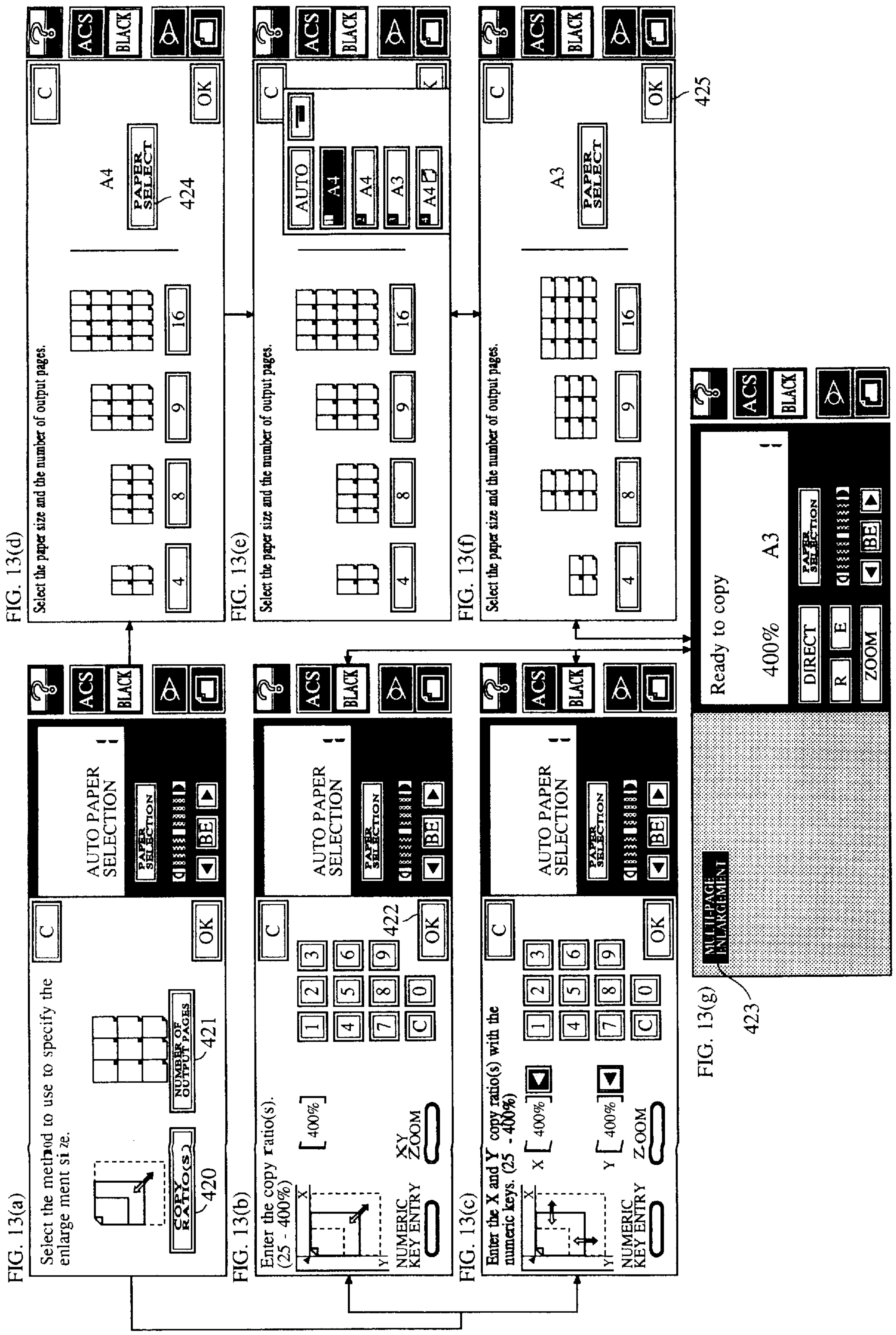
FIG. 13(a)
Select the method to use to specify the enlarge ment size.
COPY RATIO(S)
420
NUMBER OF OUTPUT PAGES
421
C
OK
AUTO PAPER SELECTION
PAPER SELECTION
BE
ACS
BLACK
FIG. 13(b)
Enter the copy ratio(s). (25 - 400%)
400%
XY ZOOM
NUMERIC KEY ENTRY
422
FIG. 13(c)
Enter the X and Y copy ratio(s) with the numeric keys. (25 - 400%)
X
Y
ZOOM
FIG. 13(d)
Select the paper size and the number of output pages.
4
8
9
16
A4
PAPER SELECT
424
FIG. 13(e)
AUTO
A3
FIG. 13(f)
425
FIG. 13(g)
Ready to copy
400%
DIRECT
R
E
MULTI-PAGE ENLARGEMENT
423

OPERATIONAL CONTROL DEVICE AND METHOD FOR AN IMAGE PROCESSING APPARATUS

BACKGROUND OF THE INVENTION

1. Field of the Invention

The present invention relates to operations for setting image processing conditions in an image processing apparatus.

2. Description of the Related Art

An operating section is used for setting image forming conditions in an image forming apparatus or in an image processing apparatus. Various conditions set for the apparatus are displayed on a liquid crystal display screen of the operating section or indicated by external LEDs. The operating section of a conventional image forming apparatus displays conditions set for the apparatus, for example color-balance settings, in only one expression format, making the conditions difficult to understand for operators who are unfamiliar with operations, in many cases. Although set color-balance settings can be stored in mode memory or the like, the number of copies to be made, a magnification, and other factors are stored together. This system is not easy to use.

In a method for setting the desired copy mode by sequentially displaying copy-mode setting screens in hierarchy, if set conditions are changed at the last setting screen after the desired copy mode has been specified, all settings have to be set again from the first setting screen, providing poor operability.

SUMMARY OF THE INVENTION

Accordingly, it is an object of the present invention to provide an operational control device which eliminates the above-described drawbacks.

Another object of the present invention is to provide an operational control device which facilitates the selection of setting conditions by displaying the set conditions in the desired expression formats.

Still another object of the present invention is to provide an operational control device which can store plural types of color-balance settings and facilitates the selection of the stored settings.

Yet another object of the present invention is to provide an operational control device which can easily change parameters for already-set image processing modes.

A further object of the present invention is to provide an operational control device which improves operability by determining the setting screen to be displayed for changing already-set image processing modes according to the input operation history of the image processing modes.

A yet further object of the present invention is to provide an operational control device which facilitates the confirmation and changing of already-set image processing modes by displaying the keys corresponding to the already-set image processing modes.

Other objects of the present invention will become clear with the following descriptions based on the accompanying drawings and the following claims.

BRIEF DESCRIPTION OF THE DRAWINGS

FIGS. 13(*a*), 13(*b*), 13(*c*), 13(*d*), 13(*e*), 13(*f*), 13(*g*) shows transition of zoom function (multi-page enlargement) setting screens.

DESCRIPTION OF THE PREFERRED EMBODIMENTS

Figure 1:
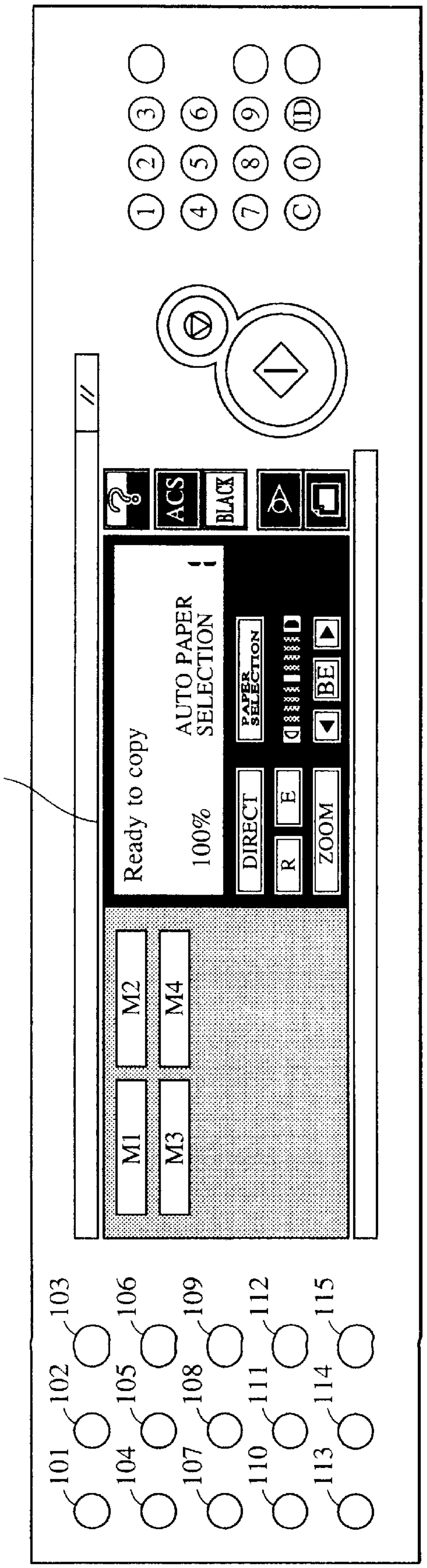
FIG. 1 illustrates an operation display section of an image forming apparatus.

Referring to the drawings, the embodiments of the present invention will be described below in detail.

FIG. 1 shows an operating display section of an image forming apparatus to which the present invention can be applied. In FIG. 1, keys 101 to 115 are used for setting various image processing operating modes, and a liquid crystal display section 116 has a touch-sensitive panel on its surface. When a key is set to on, the corresponding image processing condition is set or reset accordingly. When a condition is set, the LED mounted in the corresponding key lights. When the condition is reset, the LED goes off. Soft keys related to image processing conditions can be created on the screen of the liquid crystal display 116.

Figure 2:
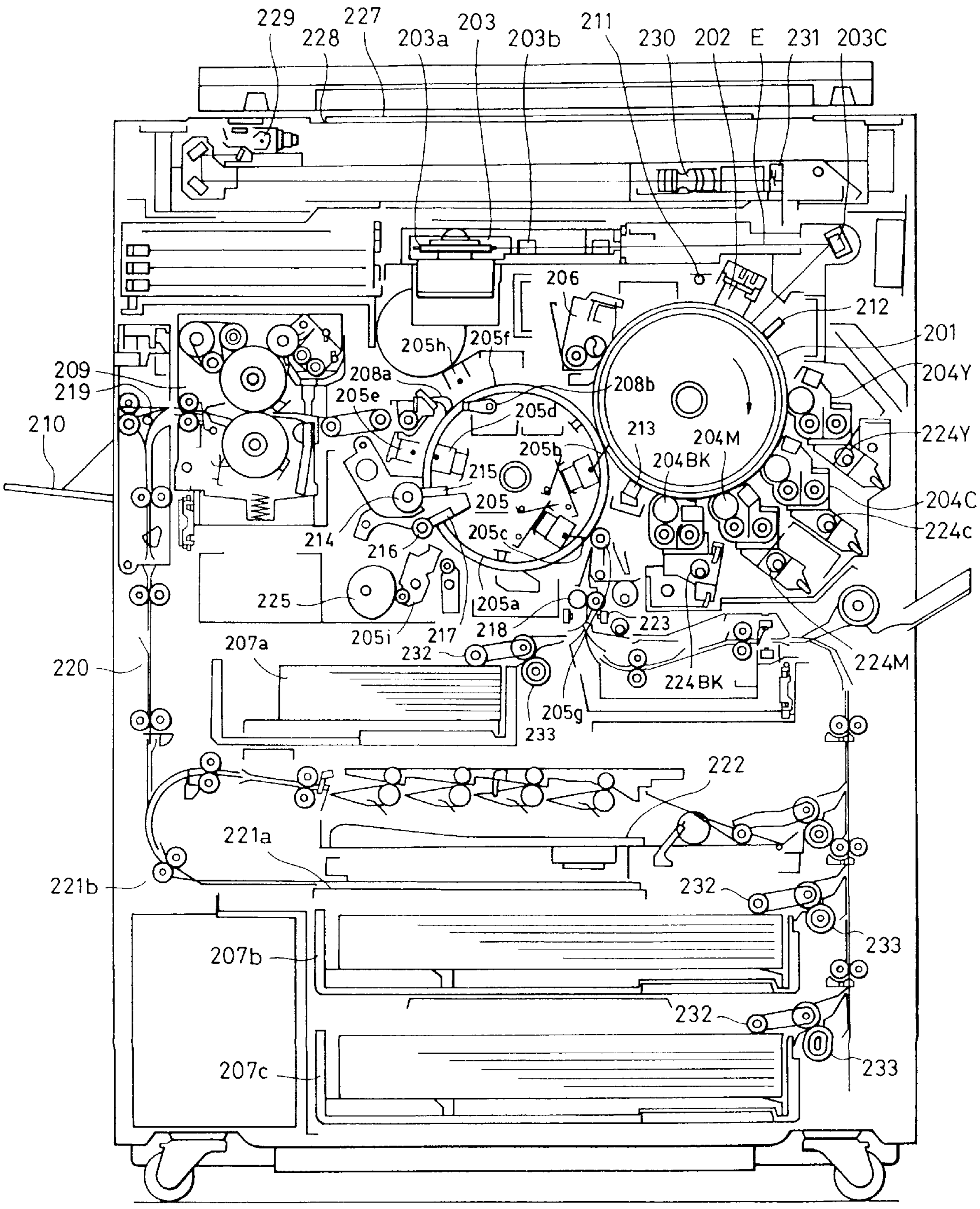
FIG. 2 is an outlined sectional view of the image forming apparatus.

FIG. 2 illustrates an outlined sectional view of the image forming apparatus. This image forming apparatus comprises a digital color image reader section at its upper part and a digital color image printer section at its lower part.

In the reader section, an original 227 placed on an original-table glass 228 is scanned with an exposure lamp 229, and its reflected image is focused on a full-color sensor 231 with a lens 230. The image is divided into color image signals corresponding to red, green, and blue. The color-separated image signals go through amplification circuits (not shown in FIG. 2) and are manipulated at a video processing unit (not shown), then sent to the printer section.

In the printer section, a photosensitive drum 201 serving as an image carrier member is held such that it can rotate freely in the direction indicated by the arrow in FIG. 2. Around the photosensitive drum 201, there are placed a pre-exposure lamp 211, a corona charging unit 202, a laser exposure optical system 203, a potential sensor 212, four developing units for different colors 204Y (for yellow),

204C (for cyan), 204M (for magenta), and 204Bk (for black), a means 213 for detecting light quantity on the drum, a transfer device 205, and a cleaning unit 206.

In the laser exposure optical system 203, each of the image signals sent from the reader section is converted to the optical signal in a laser output section (not shown). The converted laser light is reflected by a polygon mirror 203*a,* and projected on the surface of the photosensitive drum 201 through a lens 203*b* and mirror 203*c*.

In an image forming process at the printer section, the photosensitive drum 201 is rotated in the direction indicated by the arrow, and charges are removed from the surface of the photosensitive drum 201 by the pre-exposure lamp 211. Then, the photosensitive drum 201 is uniformly charged by a charging unit 202, and a light image E is illuminated on the drum 201 for each separated color to form a latent image.

The latent image on the photosensitive drum 201 is developed using the developing units to form the toner image on the photosensitive drum 201. The developing units selectively approach the photosensitive drum 201 by the movement of eccentric cams 224Y, 224*c,* 224M, and 224BK.

Recording members to which images are transferred are placed in recording member cassettes 207*a,* 207*b,* and 207*c*. One piece of recording members are picked up from the corresponding cassette by a pickup roller 232, and conveyed toward a register roller 218 by a sheet feeding roller 233.

A light-transmitting sensor 223 is placed immediately before the register roller to determine the size of the recording member being conveyed using the time period in which the recording member intercepts a light to the sensor. When the recording member reaches the register roller, the register roller sends the recording member to a transfer drum 205*a* such that the top of the recording member is located at the top position of the image on the photosensitive drum 201. The recording member is electrostatically adsorbed on the transfer drum by an adsorption roller 205*g* and an adsorption charging unit 205*c,* both of which are counter electrodes for each other. Then, the image on the photosensitive drum is transferred to the recording member by a transfer charging unit 205*b*.

The transfer device 205 comprises, in this embodiment, the transfer drum 205*a,* the transfer charging unit 205*b,* the adsorption roller 205*g* and the adsorption charging unit 205*c,* both of which are counter electrodes for each other and are used for electrostatically adsorbing the recording member, an inner charging unit 205*d,* and an outer charging unit 205*e,* wherein a recording-member carrier sheet 205*f* made of a dielectric member is integrally and cylindrically set up at the opening area of the outer peripheral surface of the transfer drum 205*a,* which is supported at its shaft for rotation. The recording-member carrier sheet 205*f* is a dielectric sheet, such as polycarbonate film.

As the transfer drum 205*a* rotates, the toner image on the photosensitive drum is transferred to the recording member carried by the recording-member carrier sheet 205*f,* by the transfer charging unit 205*b*.

As described above, a specified number of color images are transferred to the recording member which is adsorption-conveyed to the recording-member carrier sheet 205*f,* and a full-color image is formed.

In forming a full-color image, when four-color toner images are transferred, the recording member is separated from the transfer drum 205*a* by the operation of a separation claw 208*a,* a separation push-up roller 208*b,* and a separation charging unit 205*h.* Then the recording member is output to a tray 210 through a heat-roller type fixing unit 209.

After transfer, toner remaining on the surface of the photosensitive drum 201 is removed by a cleaning unit 206. Then the photosensitive drum is again used in the image forming process.

To form images on both sides of a recording member, once an image has been formed on one side of the recording member, the recording member is conveyed in the following way, then another image is formed on the other side of the recording member in the above-described image forming process. When the recording member passes the fixing unit 209, a convey-path change-over guide 219 is immediately driven to convey the recording member to a reversing path 221*a* through a vertical convey path 220. Then a reversing roller 221*b* is reversed to convey the recording member in the direction opposite the direction the recording member was conveyed before, with the end of the recording member when it was conveyed being the top. Then, the recording member is placed in an intermediate tray 222.

The surface of the recording-member carrier sheet 205*f* of the transfer drum 205*a* is cleaned in order to prevent toner from scattering or adhering to the sheet 205*f* and also to prevent oil from adhering to a recording member, with a fur brush, a back-up brush 215 located opposite the brush 214 against the recording-member carrier sheet 205*f,* an oil removing roller 216, and a back-up brush 217 located opposite the roller 216 against the recording-member carrier sheet 205*f.* This cleaning is performed before or after an image is formed, and also performed if paper jamming occurs.

In this embodiment, a gap between the recording-member carrier sheet 205*f* and the photosensitive drum 201 can be arbitrary set by operating the eccentric cam 225 at the desired timing to operate a cam follower 205*i* integrated with the transfer drum 205*a.* When the power is off or in standby, the gap between the transfer drum and photosensitive drum expands.

The image forming apparatus of this embodiment has a color-balance adjustment function which adjusts the composition ratio of four colors, Y (yellow), M (magenta), C (cyan), and Bk (black) for each color to get the desired hue.

Conventionally, this color-balance adjustment function has been provided. However, only one composition ratio can be stored when color balance is adjusted. The stored contents are displayed on the color-balance adjustment screen as is. As the demand for color copying machines has been increasing and they are being used frequently in these days, it is required that the hue can be changed for each original or for each user. Therefore, it has become necessary to store a plurality of color-balance settings.

This also requires that a new operational control device identifies stored plural color-balance settings, unlike the conventional operational control device.

Figure 3:
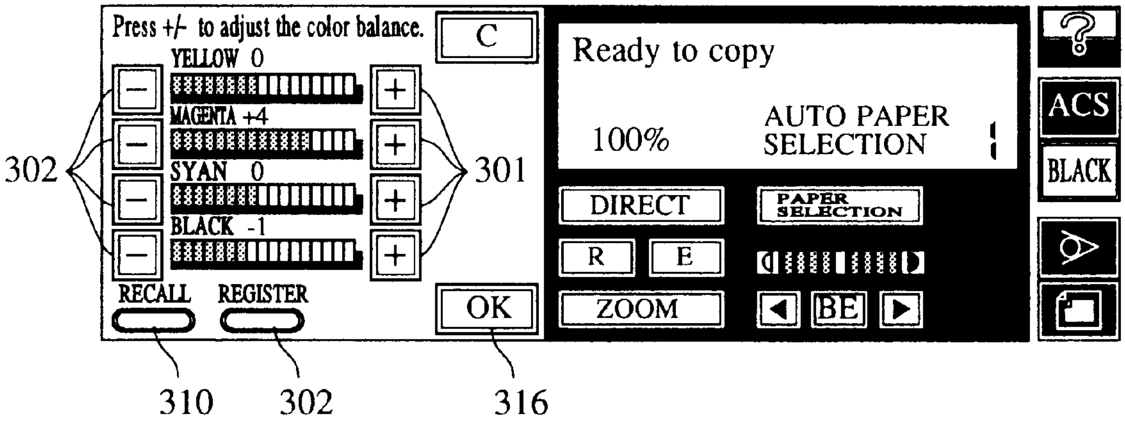
FIG. 3 shows a color-balance setting screen.
Figure 4:
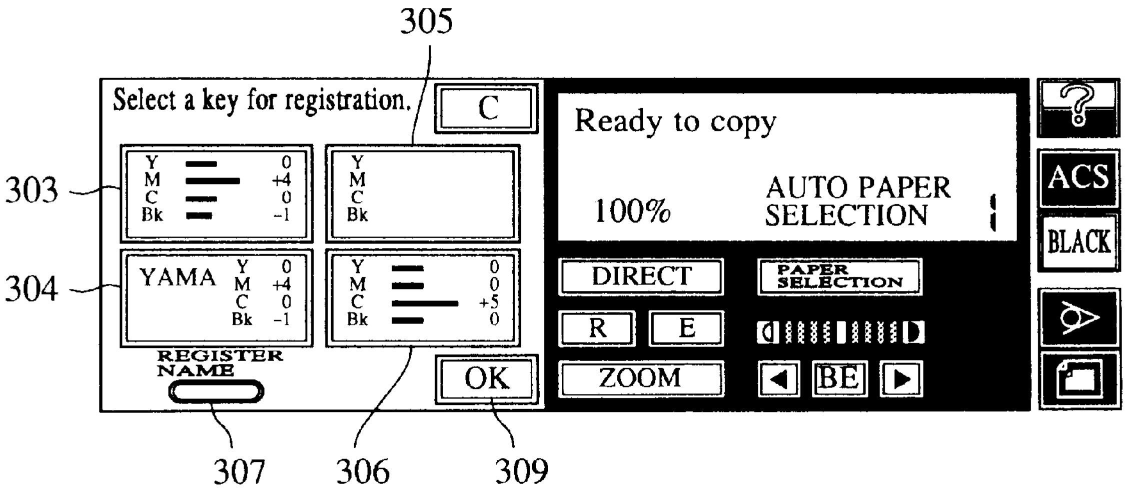
FIG. 4 shows a color-balance register screen.
Figure 7:
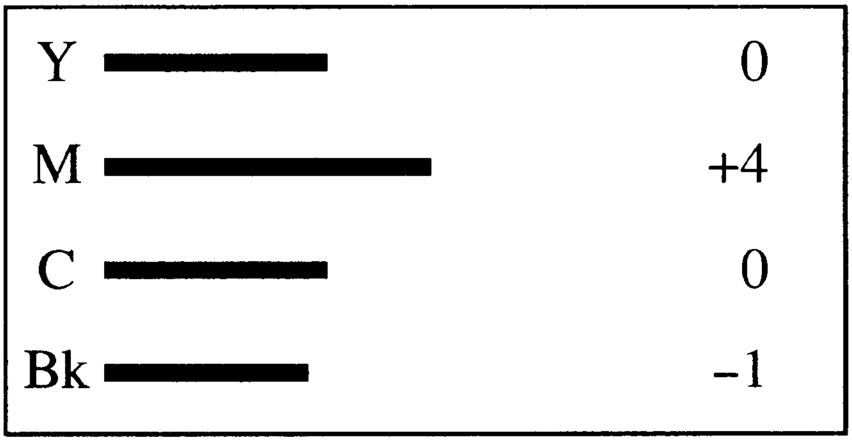
FIG. 7 shows one of color-balance register keys.
Figure 8:
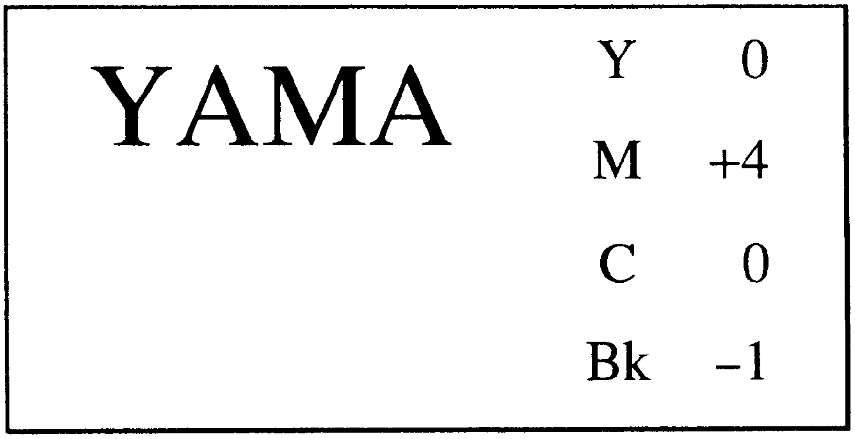
FIG. 8 shows one of color-balance register keys.

In this embodiment, a plurality of color-balance settings can be stored as described below. When a color-balance key 101 (shown in FIG. 1) is pressed, a color-balance adjustment screen on the liquid crystal display section as shown in FIG. 3 is displayed. A color composition ratio can be adjusted for each color of yellow, magenta, cyan, and black using "+" keys 301 and "−" keys 302. To store an adjusted color-balance setting, the procedure described below is followed. A REGISTER key 302 located at the bottom of the displayed screen is pressed, and an OK key 316 is pressed. Then, a color-balance store screen shown in FIG. 4 is displayed on the liquid crystal display section. In this embodiment, four color-balance settings can be stored, and two types of store methods are provided, a usual store procedure, and store-by-name (or store-by-title) procedure. In the usual store procedure, when the area (corresponding key 303, 304, 305, or 306) in which a color-balance setting is to be stored is pressed on the color-balance store screen shown in FIG. 4, the color-balance setting adjusted on the color-balance adjustment screen is displayed on the pressed area (key) with the bar graph and figures corresponding to the color composition ratio as shown in FIG. 7. When the OK key 309 is pressed, the color-balance setting is stored in the memory area corresponding to the pressed area.

Figure 5:
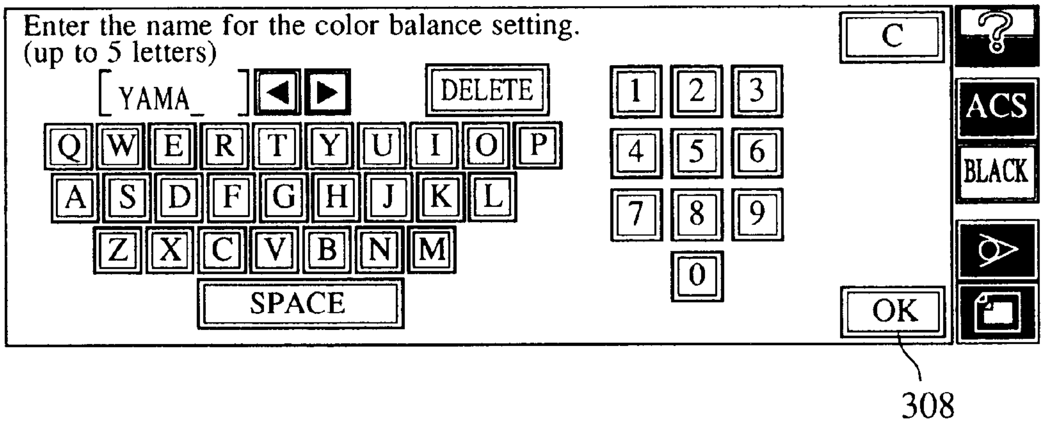
FIG. 5 shows a screen used for inputting a name in color-balance registration.

In the store-by-title procedure, when the area (corresponding key) in which a color-balance setting is to be stored, a REGISTER NAME key 307 (or a title-store key) located at the bottom, and the OK key 309 are pressed in that order on the color-balance store screen shown in FIG. 4, a color-balance title-store screen shown in FIG. 5 is displayed and a title can be stored. When the desired title (consisting up to five characters) is input using the keyboard displayed on the display section and when the OK key 308 is pressed, the color-balance store screen shown in FIG. 4 is displayed again. The color-balance setting adjusted on the color-balance adjustment screen shown in FIG. 3 and the title set in the color-balance title-store screen shown in FIG. 5 are displayed on the area (key 303, 304, 305 or 306) as shown in FIG. 4 with the title and figures instead of a bar graph and figures. When the OK key 309 is pressed, the setting and title are stored in the memory.

As shown in FIG. 4, color-balance settings can be displayed in either of these two methods (or expression formats) on the screen (both methods can be used at the same time). The operator can store a color-balance setting in the desired expression format. In confirming or recalling a previously stored color-balance setting, a RECALL key 310 and the OK key 316 both located at the bottom of the color-balance adjustment screen shown in FIG. 3 are pressed in that order to display a color-balance recall screen shown in FIG. 6 on the liquid crystal display section. One of stored color-balance settings can be called on this screen. When an area (one of keys 311 to 314) in which the color-condition to be called is stored is pressed, the color-balance setting stored at the memory area corresponding to the pressed key is called. The two expression formats for describing color-balance settings can also be used in this color-balance recall screen. Settings expressed in either of the two expression formats are displayed (both formats can be used at the same time for different settings). This means that the operator can check the stored color-balance information without actually selecting each of them, facilitating storing of a new color-balance setting and calling of an existing color-balance setting.

Referring to the block diagram shown in FIG. 9 and the flow chart illustrated in FIG. 10 and FIG. 11, the above-described color-balance adjustment will be further described below.

Figure 9:
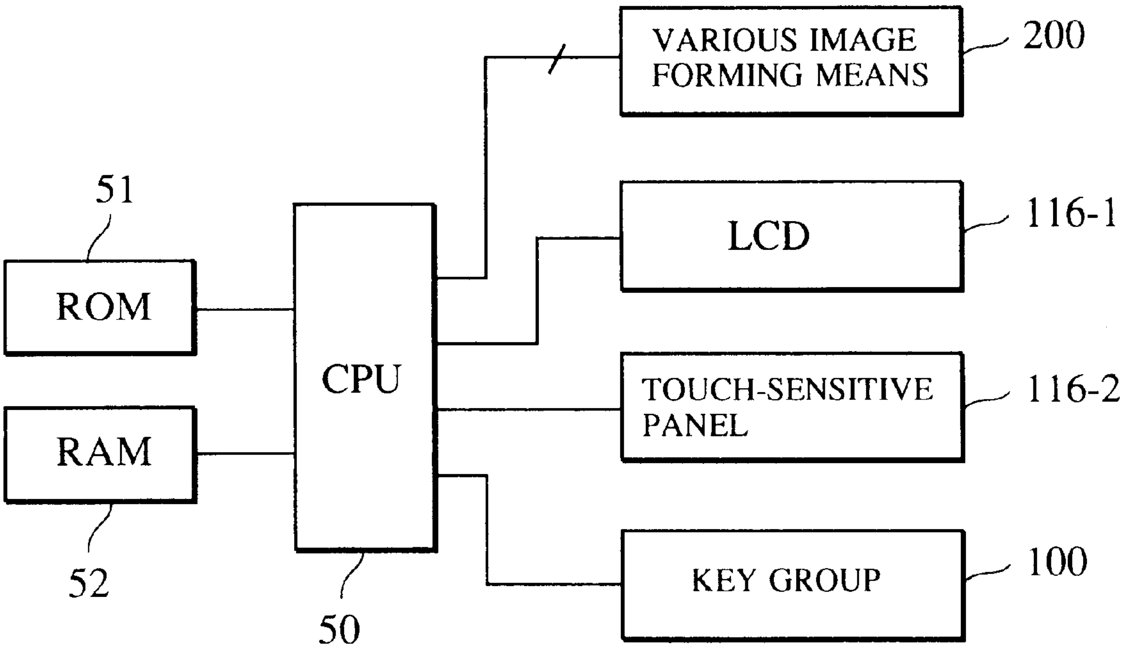
FIG. 9 is a block diagram illustrating a simplified configuration of the image forming apparatus.

FIG. 9 is a block diagram showing the configuration of the image forming apparatus. In FIG. 9, the image forming apparatus comprises a CPU 50 which controls the operation of the apparatus; ROM 51 for storing various control programs, control data, and various-screen data; RAM 52 which can store various data items and which also serves as a CPU work area; a key group 100 including the keys 101 to 115 shown in FIG. 1, keys on a ten-key pad, a copy start key, and the like; a display unit 116-1 which is part of the display section 116 shown in FIG. 1 and is actually a liquid crystal display (LCD); a touch-sensitive panel 116-2 serving as a input means which is part of the display section 116 and is a well-known device; and various image-forming means 200, such as the exposure lamp and motors of the image forming apparatus shown in FIG. 2, which is directly or indirectly controlled by the CPU 50.

Figure 10:
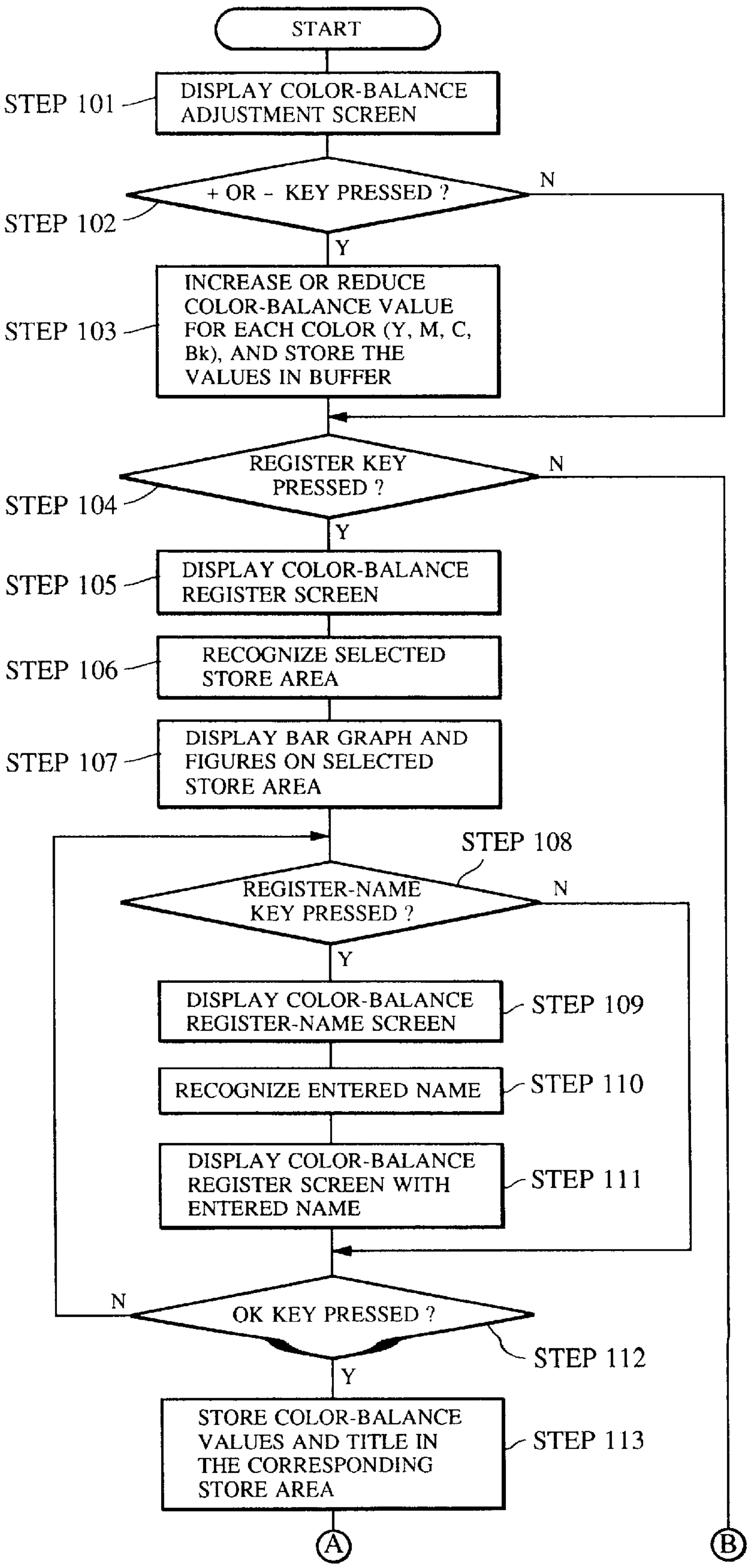
FIG. 10 is a flowchart indicating processing of a color-balance adjustment mode.
Figure 11:
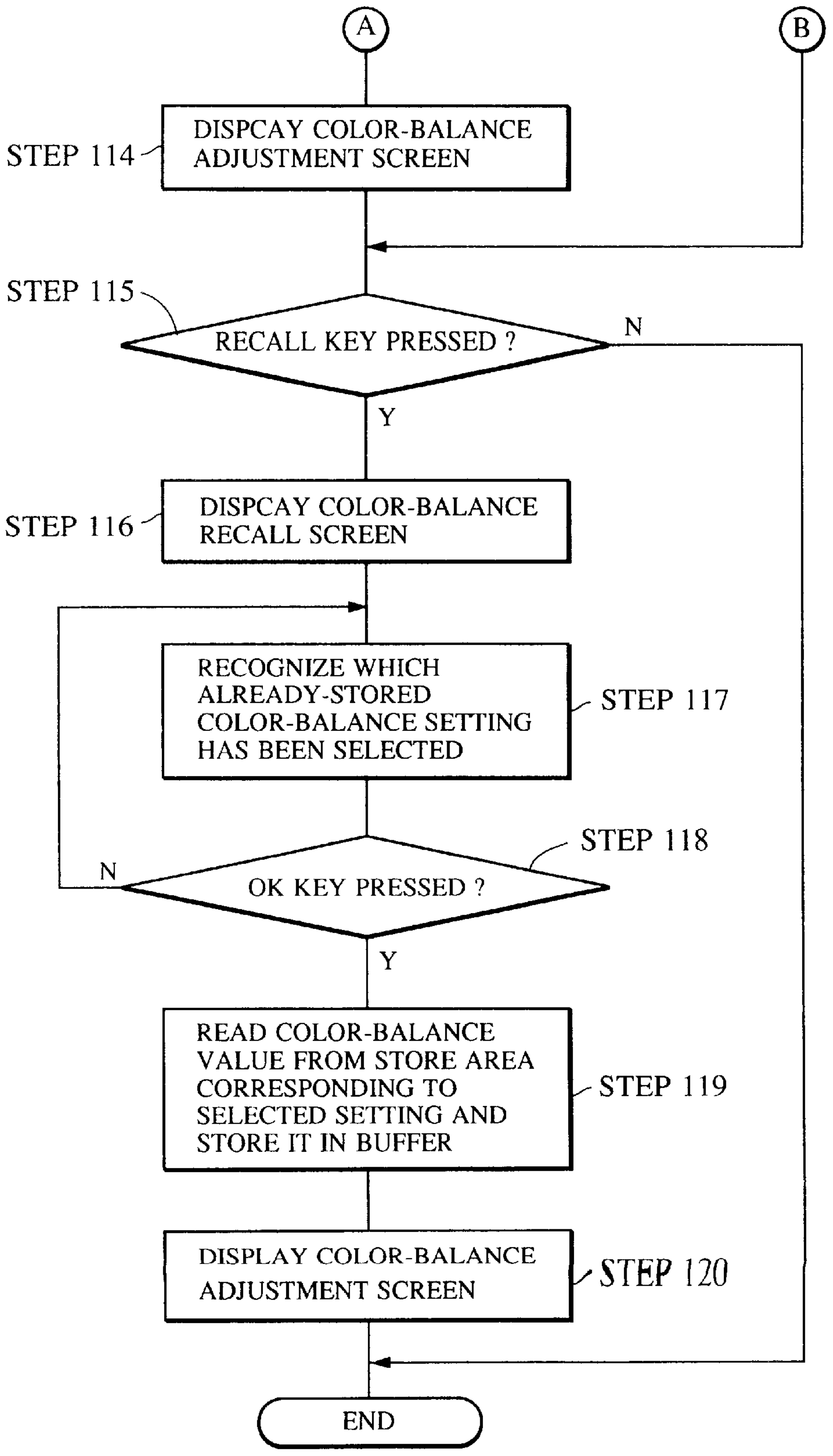
FIG. 11 is a flowchart indicating processing of the color-balance adjustment mode.

FIG. 10 and FIG. 11 shows the control flow used for color-balance adjustment. This flow is stored in the ROM 51 in advance.

Figure 6:
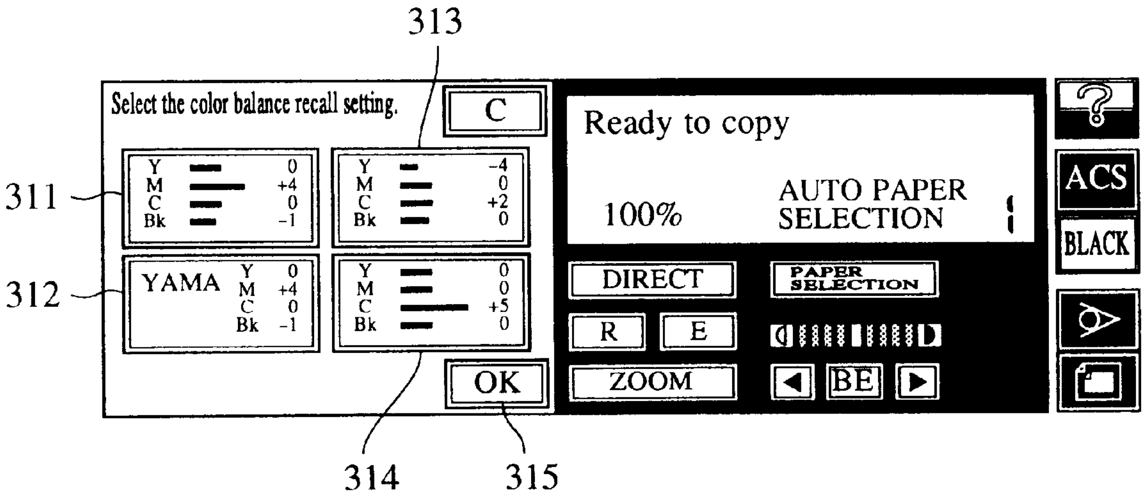
FIG. 6 shows a color-balance recall screen.

When the color-balance key 101 is pressed, the color-balance adjustment screen shown in FIG. 3 appears on the display section (step 101). Whether the + key 301 or the – key 302 for each color is pressed is checked (step 102). When the + key 301 or the – key 302 is pressed, the color-balance value for the corresponding color (one of Y, M, C, and Bk) is increased or reduced accordingly, and the set value is stored in the buffer area of the RAM 51 (step 103). In the next step, whether the REGISTER key 302 is pressed is checked (step 104). When pressed, the color-balance store screen shown in FIG. 4 is displayed (step 105). Then, which store area, one of 303 to 306, is selected for storing the set color balance is recognized (step 106), and the color balance is displayed on the selected store area with the bar graph and figures (step 107). Whether the REGISTER NAME key 307 is pressed is checked (step 108). When pressed, the color-balance title-store screen shown in FIG. 5 is displayed (step 109). A title input by the user with the keyboard displayed on the display section 116 is stored in the buffer area, and is recognized when the OK key 308 is pressed (step 110). Then, the color-balance store screen is again displayed with the input title instead of the bar graph, as shown in FIG. 4 (step 111). When the OK key 309 is pressed, the set color balance setting and its title are stored in the corresponding memory area from the buffer area of the RAM 51 (step 113). The color-balance adjustment screen shown in FIG. 3 is displayed again (step 114), and whether the RECALL key 310 is pressed is checked (step 115). When pressed, the color-balance recall screen shown in FIG. 6 is displayed (step 116). Which color-balance setting the user has stored, one of conditions 311 to 314, has been selected is recognized (step 117). Whether the OK key 315 is pressed is checked (step 118). When pressed, the color-balance value is read from the memory area of the RAM 51 corresponding to the selected color-balance setting and is stored in the buffer for storing the current color-balance value (step 119), then according to the color-balance value stored in the buffer, the color-balance adjustment screen shown in FIG. 3 is displayed (step 120).

When a CANCEL key is pressed on each display screen, the selected state on the screen is canceled.

As a second embodiment of the present invention, a function for displaying the key corresponding to a set mode on the standard screen, and for directly displaying the setting screen of the set mode when the key is pressed will be described below using the drawings.

In this embodiment, XY zoom and multi-page enlargement functions will be described, which is two of the zoom functions, one of most frequently used functions of a copying machine.

These two functions have been used conventionally. However, only the LED corresponding to the XY zoom or multi-page enlargement function lights when the mode is set.

Figures 12A, 12B, 12C, 12D:
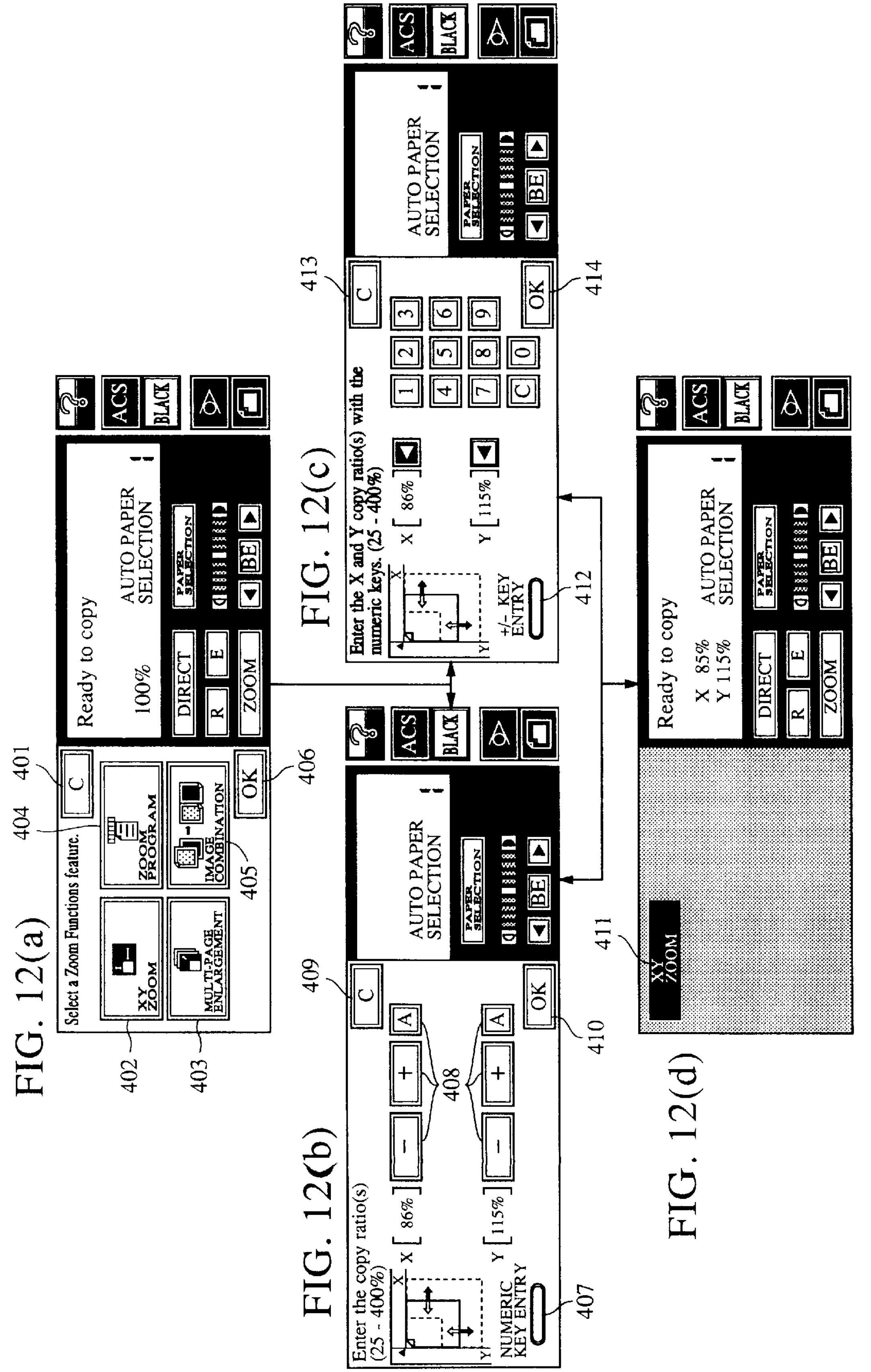
FIGS. 12(*a*), 12(*b*), 12(*c*), and 12 (*d*) show transition of zoom function (XY zoom) setting screens.

In this embodiment, when a ZOOM FUNCTION key 102 (shown in FIG. 1) is pressed on the operating section, a main zoom-function screen is displayed on the liquid crystal display section 116, as shown in FIG. 12 (*a*), and a type of zoom function can be selected. In selecting the XY zoom function, the XY ZOOM key 402 and the OK key 406 are pressed in that order on the screen to display one of the XY zoom setting screens shown in FIGS. 12(*b*) and(*c*). The screens shown in FIGS. 12(*b*) and(*c*) are used for setting the same items with the different methods. The screen shown in FIG. 12(*b*) is usually displayed first. When the numeric-key-entry key 407 is pressed, the screen is changed to that shown in FIG. 12 (*c*). When one of OK keys 410 and 414 is pressed on either screen, the XY zoom function is set and the standard screen shown in FIG. 12 (*d*) appears on the display section 116. An XY ZOOM key 411 is displayed at the left on the display section to indicate that the XY zoom function has been set. This means that the set image processing item (XY zoom in this case) is displayed as the corresponding key on the screen.

When the already set XY zoom mode is changed, the XY ZOOM key 411 shown in FIG. 12 (*d*) is pressed to immediately display the XY zoom setting screen (FIG. 12 (*b*) or (*c*)), without pressing the zoom function key 102. This means that the main zoom-function screen shown in FIG. 12 (*a*) used for selecting the type of zoom function is skipped in changing the screen to the desired screen.

In selecting the multi-page enlargement function, the MULTI-PAGE ENLARGEMENT key 403 on the main zoom-function screen shown in FIG. 12 (*a*), and then the OK key 406 are pressed. The main multi-page enlargement screen shown in FIG. 13 (*a*) appears. When a COPY RATIO(S) KEY 420 is pressed, one of the screens shown in FIGS. 13(*b*) and (*c*) and the like is displayed (an input screen having +/− keys is not shown). When a magnification is set and the OK key 422 is pressed, the multi-page enlargement function is set. Then, the MULTI-PAGE ENLARGEMENT key 423 is displayed at the left of the standard screen as shown in FIG. 13 (*g*). When a NUMBER-OF-OUTPUT-PAGES (or number-of-sheets) key 421 is pressed on the main multi-page enlargement screen, the screen shown in FIG. 13 (*d*) is displayed. When the number of sheets is selected and a PAPER SELECTION key 424 is pressed, the screen is changed to the screen shown in FIG. 13(*e*), then to the screen shown in FIG. 13 (*f*). When an OK key 425 is pressed on this screen, the multi-page enlargement function is set and the standard screen shown in FIG. 13 (*g*) is displayed. The MULTI-PAGE ENLARGEMENT key 423 is displayed at the left on the screen. This means that the set image processing item (multi-page enlargement in this case) is displayed on the key.

When the already set multi-page enlargement mode is changed, the MULTI-PAGE ENLARGEMENT key 423 on the screen shown in FIG. 13 (*g*) is pressed to immediately display a screen used for setting the multi-page enlargement function in detail, such as those shown in FIGS. 13(*b*), (*c*), and (*f*). The main zoom-function screen (shown in FIG. 12 (*a*)) used for selecting the type of zoom function and the main multi-page enlargement screen (shown in FIG. 13 (*a*)) are skipped when the screen is switched to the desired screen. According to the screen on which the multi-page enlargement function has been set, one of screens such as those shown in FIGS. 13(*b*), (*c*) and (*f*), the screen to which the current screen returns is different. Namely, the current screen returns to the previously selected screen.

When the operational control device is configured as described above, the operator can easily check set modes in detail or change them, by pressing the corresponding mode keys displayed on the standard screen.

Figure 14A:
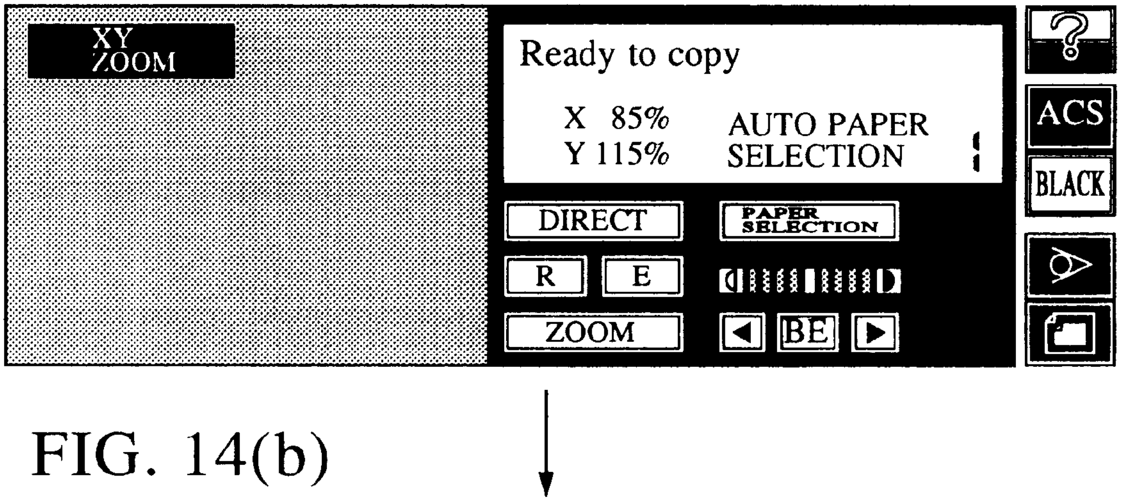
FIGS. 14(*a*), 14(*b*), 14(*c*), shows transition of the reference screen on a touch-sensitive panel when image processing modes are additionally specified.
Figure 14B:
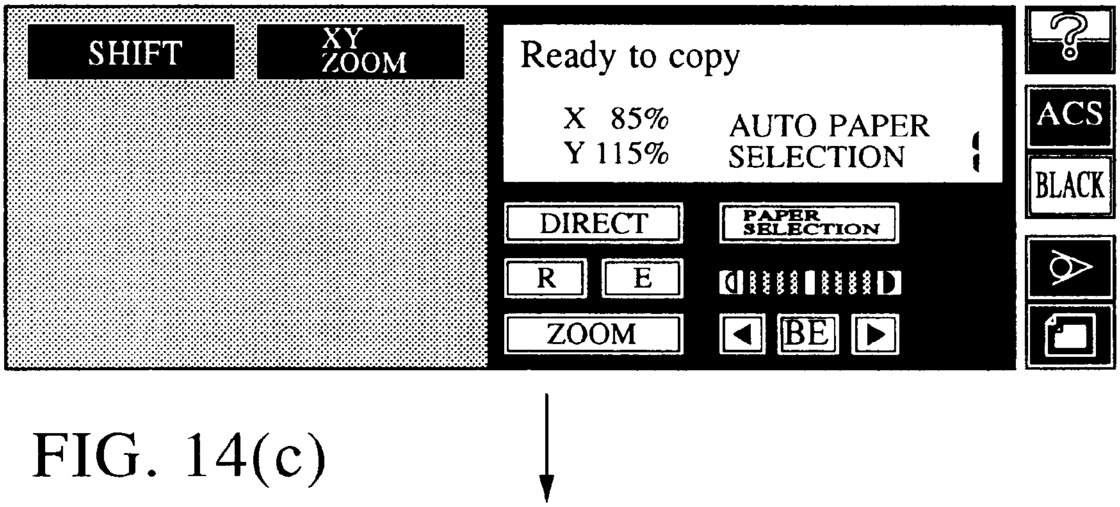
Figure 14C:
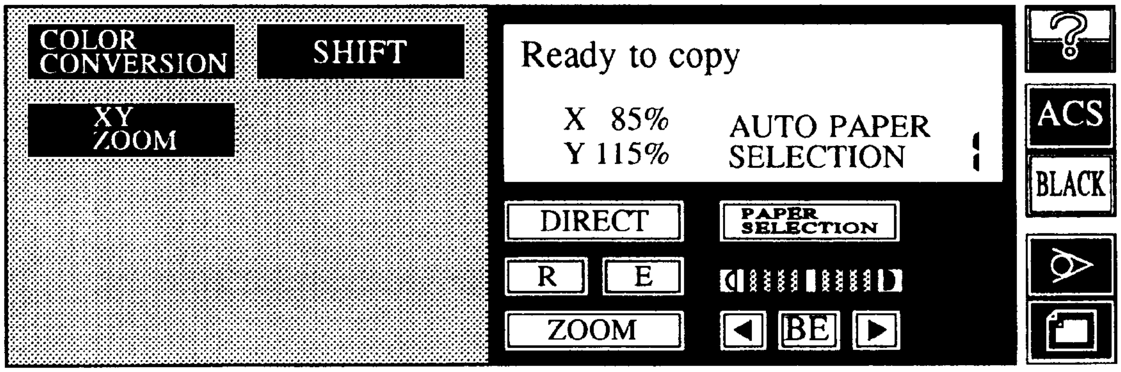

When a plurality of modes which can be set in combination is set, the key corresponding to the mode last set is displayed at the upper left corner of the screen, and the key or keys corresponding to a mode or modes previously set is displayed at another place or places on the screen as shown in FIG. 14. When the XY zoom function is first set, the shift function is secondary set, and then the color conversion function is set, for example, the screen changes as shown in FIGS. 14(*a*), (*b*), and (*c*) (the detailed setting screens for each mode are omitted here).

Figures 15A, 15B, 15C, 15D:
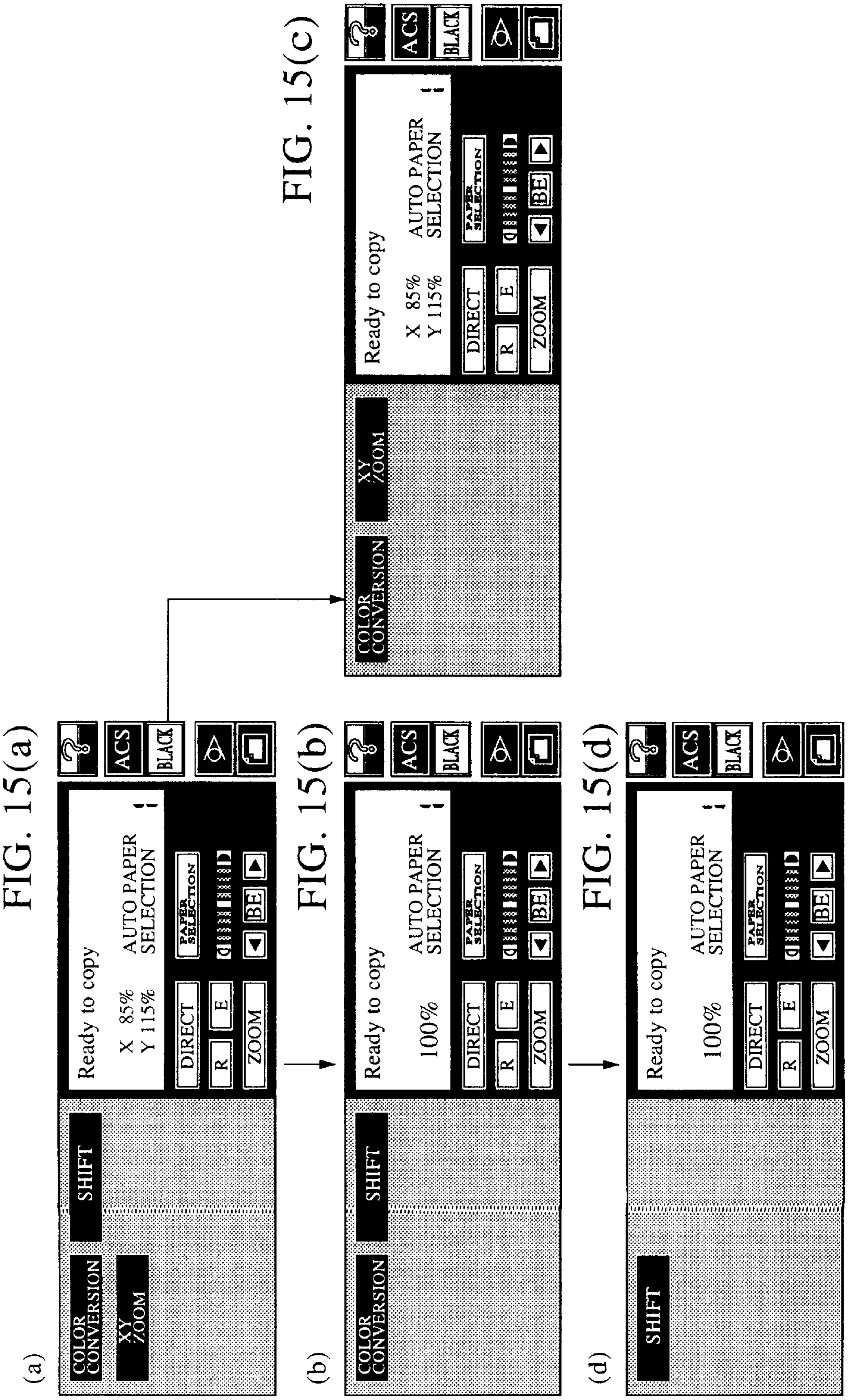
FIGS. 15(*a*), 15(*b*), 15(*c*), 15(*d*) shows transition of the reference screen on the touch-sensitive panel when already-set image processing modes are canceled.

When a set mode is canceled, the keys corresponding to the set modes change as shown in FIG. 15. When various modes are set as shown in FIG. 15 (*a*) and the XY zoom function is canceled, the screen changes to that shown in FIG. 15 (*b*). When the color conversion function is canceled next, the screen changes to that shown in FIG. 15 (*d*). When the shift function is canceled in the state shown in FIG. 15 (*a*), for another example, the screen changes to that shown in FIG. 15 (*c*). As shown in these examples, when a set mode is canceled, the corresponding key is deleted on the screen and the other keys are arranged in the setting order of the corresponding modes. This means that the way in which mode keys are arranged is unchanged and the key corresponding to the mode set last is always displayed at the upper left corner of the screen.

Therefore, the operator easily understands, among the modes he or she has set, which mode has priority over the other modes because the keys corresponding to the set modes are arranged in their setting order.

The display flow of the mode setting screen will be described below by referring to the flowcharts shown in FIGS. 16 and 17.

When the zoom function key 102 is pressed, the main zoom-function screen shown in FIG. 12 (*a*) is displayed on the display section 116 (step 200). Whether the CANCEL key 401 is pressed is checked (step 201), then whether the XY ZOOM key 402, the MULTI-PAGE ENLARGEMENT key 403, a ZOOM PROGRAM key 404, or a IMAGE COMBINATION key 405 is pressed is checked (steps 202 and 203). When the XY ZOOM key 402 is set to on, whether the OK key 406 is turned on is checked (step 204). When it is turned on, the setting screen having the + and − keys shown in FIG. 12 (*b*) is displayed (step 206). Until the OK key 406 is pressed, the mode can be changed to other mode in the zoom function. After the screen shown in FIG. 12 (*b*) is displayed, whether the NUMERIC-KEY-ENTRY key 407 is set to on is checked (step 207). When it is set to on, the setting screen having the ten-key pad shown in FIG. 12 (*c*) is displayed (step 213). When the key 407 is not set to on, whether a magnification is input with the +, −, and A keys 408 is checked (step 208). When a magnification is input, it is displayed on the screen, for example, as shown in FIG. 12 (*b*) (step 209). Whether the CANCEL key 409 is turned on is checked (step 210). When it is turned on, the flow returns to step 200. When it is not turned on, whether the OK key 410 is pressed is checked (step 211). When the OK key is not pressed, the flow returns to step 207. When the OK key is pressed, a flag indicating that a magnification for XY zoom has been set on the screen shown in FIG. 12 (*b*) is set to 1 (step 212). Then, the standard screen shown in FIG. 12 (*d*) is displayed with the XY ZOOM key 411, which indicates that a magnification has been set in the XY zoom mode, being displayed at the left (step 212).

When the setting screen having the ten-key pad is displayed, whether a +− KEY INPUT key 412 is turned on is checked (step 214). When it is turned on, the flow returns to step 206 and the screen shown in FIG. 12 (*b*) is displayed again. When the key 412 is not turned on, whether a magnification is input with the ten-key pad is checked (step 215). When it is input, the magnification in the specified direction (X or Y) is displayed as shown in FIG. 12 (*c*) (step 216). Whether a CANCEL key 413 is turned on is checked (step 218). When it is turned on, the flow returns to step 200. When it is not turned on, whether an OK key 414 is turned on is checked (step 218) When it is not turned on, the flow returns to step 214. When it is turned on, the flag indicating that a magnification for XY zoom has been set on the screen shown in FIG. 12 (*c*) is set to 2 (step 219). Then, the standard screen is displayed as shown in FIG. 12 (*d*) with the XY ZOOM key 411 being displayed at the left (step 212).

When the multi-page enlargement function or the zoom program function is selected on the screen shown in FIG. 12 (*a*), the screen changes to the corresponding setting screen. When parameters are set, the setting screen flag is set in the same way as in the XY zoom function, and the MULTI-PAGE ENLARGEMENT key or the ZOOM PROGRAM key is displayed at the left on the standard screen.

When the CANCEL key 401 is turned on in step 201, the setting screen flags corresponding to the previously set modes of the zoom function are cleared (step 220), and the keys indicating that the already-set other modes are set according to the setting screen flags of the modes are displayed (step 221).

Figure 17:
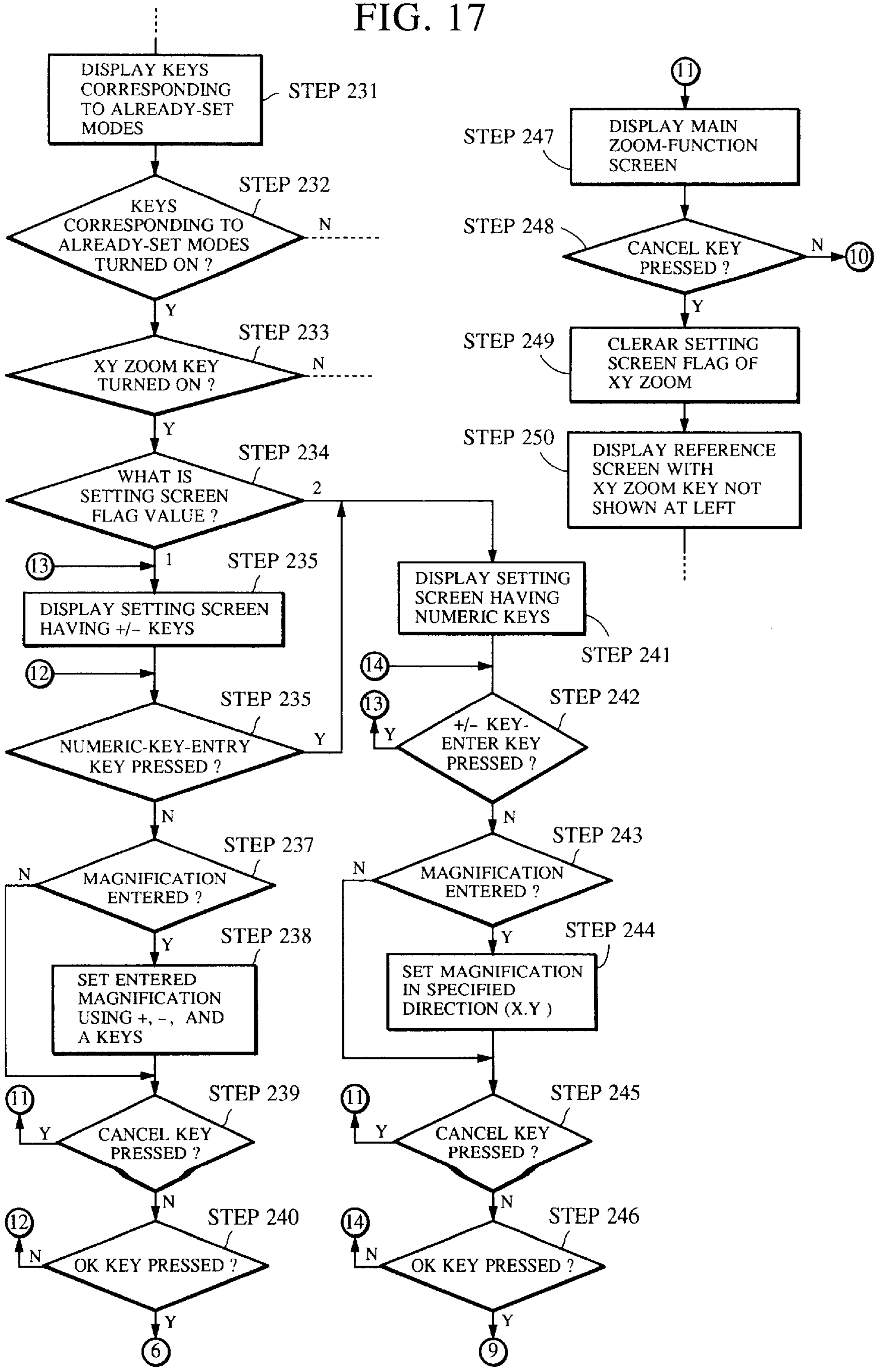
FIG. 17 is a flowchart indicating the zoom-function setting procedure.

Referring to FIG. 17, an example for canceling a mode will be described below.

When keys such as the XY ZOOM key and the MULTI-PAGE ENLARGEMENT key are displayed at the left on the standard screen, whether the keys corresponding to these already set modes are turned on is checked (step 232). When they are not turned on, the flow goes to other processing. When keys are turned on, which keys are turned on is checked (step 233). When the XY ZOOM key is turned on, the setting screen flag stored in RAM is checked (step 234). When the flag is 1, the screen shown in FIG. 12 (*b*) is displayed (step 235). When the flag is 2, the screen shown in FIG. 12 (*c*) is displayed (step 241).

Figure 16:
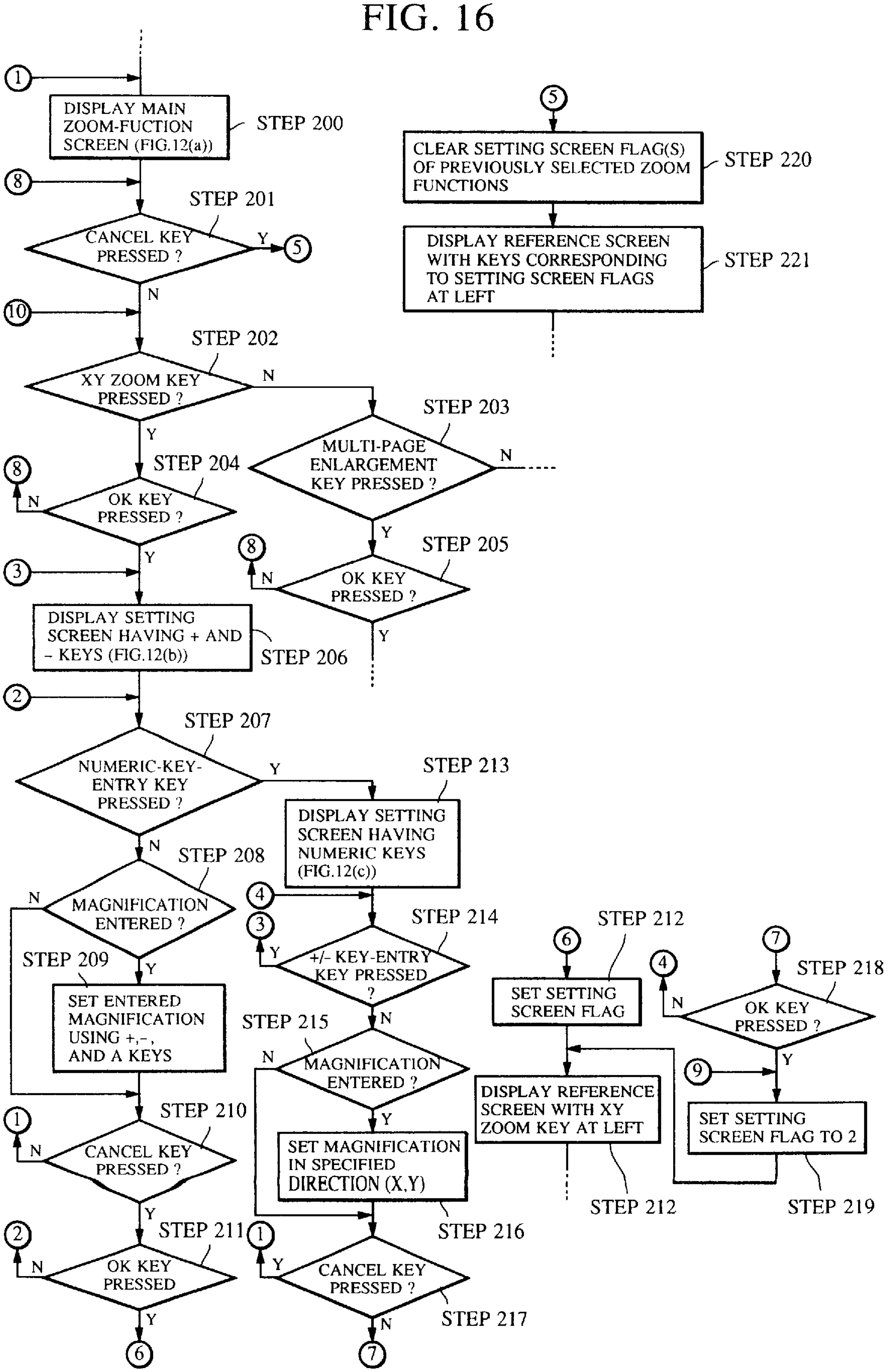
FIG. 16 is a flowchart indicating a zoom-function setting processing.

Since steps 236 to 240 and 242 to 246 are the same as steps 207 to 211 and 214 to 217 shown in FIG. 16, they are not described here. When a CANCEL key is determined to be turned on in step 239 or 245, the main zoom-function screen shown in FIG. 12 (*a*) is displayed (step 247), and whether the CANCEL key on the screen is turned on is checked. When the key is not turned on, the flow goes to step 202 and subsequent steps shown in FIG. 16. When the key is turned on, the setting screen flag of the XY zoom function is cleared (step 249). Then, the standard screen is displayed with the XY ZOOM key which had been shown at the left being not displayed (step 250).

The same flows are applied to the other modes in the zoom function.

The present invention can also provide various embodiments other than the above-described embodiments within the scope specified in the claims described below.

What is claimed is:

1. An operational control device of an image processing apparatus comprising:

display means;

first display control means for controlling display of a screen for adjusting a single group of color-balance data, which has a plurality of adjustment values for each color component, on said display means, input means for manually inputting adjustment values of a single group of color-balance data in a condition that said screen is displayed by said first display means;

memory means for storing plural groups of color-balance data;

second display control means for concurrently controlling display of each of said plural groups of color-balance data stored in said memory means on said display means, differently from the screen displayed by said first display control means; and selection means for selecting the color-balance of the desired group from among said plural groups of color-balance data displayed on said display means.

2. An operational control device of an image processing apparatus according to claim 1, wherein said second display control means for controlling display of each of said plural groups of color-balance data in the form of the adjustment values.

3. An operational control device of an image processing apparatus according to claim 1, wherein said second display control means for controlling display of each of said plural groups of color-balance data in a form of a bar-shaped graph.

4. An operational control device of an image processing apparatus comprising:

display means;

first display control means for controlling display of a screen for adjusting processing condition data concerning image processing of a single group on said display means;

input means for manually inputting processing condition data of a single group in a condition that said screen is displayed by said first display control means;

memory means for storing plural groups of processing condition data set by said input means;

second display control means for concurrently controlling display of each of said plural groups of processing condition data stored in said memory means on said display means, differently from the screen displayed by said first display control means; and selection means for selecting the processing conditions of the desired group from among said plural groups of processing condition data displayed on said display means.

5. An operation control device of an image processing apparatus according to claim 4, said operational control device further comprising processing means for manipulating images according to said processing condition data selected by said selection means.

6. An operational control method of an image processing apparatus comprising the steps of:

a) a first displaying step for displaying, on a display, a first setting screen for selecting types of image processing modes;

b) a second displaying step for displaying a second setting screen for setting a parameter of the image processing mode selected by an operator on the basis of the displayed first setting screen on the display;

c) a third displaying step for displaying an icon different from said first setting screen, to indicate said image processing mode is selected on the display, in response to the parameter of the image processing mode set by an operator on the basis of the displayed second setting screen in the second displaying step, said icon representing a button which is operable by the operator; and d) a fourth displaying step for displaying said second setting screen on the display without displaying said first setting screen in response to the icon displayed in said third displaying step being selected by the operator.

7. An operational control method of an image processing apparatus according to claim 6, wherein an icon including the name of the selected image processing mode in said third displaying step.

8. An operational control method of an image processing apparatus according to claim 6, wherein the display of the first setting screen is erased and the second setting screen is displayed in said second displaying step.

9. An operational control method of an image processing apparatus according to claim 8, wherein the display of the second setting screen is erased and the icon is displayed in said third displaying step.

10. An operational control method of an image processing apparatus according to claim 6, wherein the display of the icon is erased and the second setting screen is displayed in said fourth displaying step.

11. An operational control method of an image processing apparatus according to claim 6, wherein said display has a touch panel for an operator to select a kind of an image processing mode, set a parameter and select an icon.

* * * * *

UNITED STATES PATENT AND TRADEMARK OFFICE

CERTIFICATE OF CORRECTION

PATENT NO. : 6,041,265
DATED : March 21, 2000
INVENTOR(S) : Akio Suzuki, et al.

It is certified that error appears in the above-identified patent and that said Letters Patent is hereby corrected as shown below:

<u>Drawings,</u>
Figure 11, "DISPCAY" should read -- DISPLAY --.

<u>Column 3,</u>
Line 27, "A light transmitting" should not start a new paragraph.

<u>Column 4,</u>
Line 32, "arbitrary" should read -- arbitrarily --; and
Line 50, "This" should not start a new paragraph.

<u>Column 8,</u>
Line 62, "+ -- KEY INPUT" should read -- + KEY INPUT --.

<u>Column 10,</u>
Line 13 "for controlling" should read -- controls --;
Line 18, "for controlling" should read -- controls --;
Line 42, "said" should read -- wherein said --; and
Line 43, "comprising" should read -- comprises --.

<u>Column 12,</u>
After Claim 11, please add the following claims:

--12. An operational control device of an image processing apparatus according to Claim 1, further comprising:

name assigning means for assigning the desired name to each of the plural groups of color-balance data stored in said memory means, wherein said second display control means displays the names assigned by said name assigning means together with the plural groups of color-balance data.

13. An operational control device of an image processing apparatus according to Claim 12, wherein said name assigning means displays on said display means a keyboard used for inputting names.

14. An operational control device of an image processing apparatus according to Claim 4, further comprising:

name assigning means for assigning the desired name to each of the plural groups of condition data stored in said memory means, wherein said second display control means displays the names assigned by said name assigning means together with the plural groups of processing condition data.

UNITED STATES PATENT AND TRADEMARK OFFICE

CERTIFICATE OF CORRECTION

PATENT NO. : 6,041,265
DATED : March 21, 2000
INVENTOR(S) : Akio Suzuki, et al.

It is certified that error appears in the above-identified patent and that said Letters Patent is hereby corrected as shown below:

15. An operational control device of an image processing apparatus according to Claim 14, wherein said name assigning means displays on said display means a keyboard used for inputting means.

16. An operational control method for an image processing apparatus comprising display means, said method comprising the steps of:

(a) causing to display a screen for adjusting a single group of color-balance data, which has a plurality of adjustment values for each color component, on said display means;

(b) causing manually to input adjustment values of a single group of color-balance data in a condition that said screen is displayed by said step (a);

(c) causing to store plural groups of color-balance data into a memory;

(d) causing concurrently to display each of said plural groups of color-balance data stored in said memory on said display means, differently from the screen displayed by said step (a); and (e) causing to select the color-balance of the desired group from among said plural groups of color-balance data displayed on said display means.

17. An operational control method for an image processing apparatus according to Claim 16, wherein each of said plural groups of color-balance data is displayed in the form of the adjustment values in step (d).

18. An operational control method for an image processing apparatus according to Claim 16, wherein each of said plural groups of color-balance data is displayed in a form of a bar-shaped group in said step (d).

19. An operational control method for an image processing apparatus according to Claim 16, further comprising the steps of:

(f) causing to assign the desired name to each of the plural groups of color-balance data stored in the memory;

wherein the names assigned in said step (f) are displayed together with the plural groups of color-balance data in step (d).

UNITED STATES PATENT AND TRADEMARK OFFICE

CERTIFICATE OF CORRECTION

PATENT NO. : 6,041,265
DATED : March 21, 2000
INVENTOR(S) : Akio Suzuki, et al.

It is certified that error appears in the above-identified patent and that said Letters Patent is hereby corrected as shown below:

20. An operational control method for an image processing apparatus according to Claim 19, wherein a keyboard used for inputting names is displayed on the display menas in step (f).

21. An operational control method for an image processing apparatus comprising display means, said method comprising the steps of:

(a) causing to display a screen for adjusting processing condition data concerning image processing of a single group on said display means;

(b) causing manually to input processing condition data of a single group in a condition that said screen is displayed by said step (a);

(c) causing to store plural groups of processing condition data input in step (b), into a memory;

(d) causing concurrently to display each of said plural groups of processing condition data stored in said memory on said display means, differently from the screen displayed by said step (a) ; and (e) causing to select the processing conditions of the desired group from among said plural groups of processing condition data displayed on said display means.

22. An operational control method for an image processing apparatus according to Claim 21, further comprising the step of:

(f) causing to process an image according to the processing conditions of the desired group selected in said step (e), 23. An operational control method for an image processing apparatus according to Claim 21, further comprising the step of:

(g) causing to assign the desired name to each of the plural groups of processing condition data stored in the memory;

wherein the names assigned in step (g) are displayed together with the plural groups of processing condition data in said step (d).

24. An operational control method for an image processing apparatus according to Claim 23, wherein a keyboard used for inputting names is displayed on the display means in step (g).

25. A memory medium storing computer-executable process steps, the process steps comprising:

(a) a step of causing to display a screen for adjusting a single group of color-balance data, which has a plurality of adjustment values for each color component, on said display means;

UNITED STATES PATENT AND TRADEMARK OFFICE
CERTIFICATE OF CORRECTION

PATENT NO. : 6,041,265
DATED : March 21, 2000
INVENTOR(S) : Akio Suzuki, et al.

It is certified that error appears in the above-identified patent and that said Letters Patent is hereby corrected as shown below:

(b) a step of causing manually to input adjustment values of a single group or color-balance data in a condition that said screen is displayed by said step (a);

(c) a step of causing to store plural groups of color-balance data into a memory;

(d) a step of causing concurrently to display each of said plural groups of color-balance data stored in said memory on said display means, differently from the screen displayed by said step (a); and (e) a step of causing to select the color-balance of the desired group from among said plural groups of color-balance data displayed on said display means.

26. A memory medium storing computer-executable process steps, the process steps,comprising:

(a) a step of causing to display a screen for adjusting processing condition data concering image processing of a single group on said display means;

(b) a step of causing manually to input processing condition data of a single group in a condition that said screen is displayed by said step (a);

(c) a step of causing to store plural groups of processing condition data input in step (b), into a memory;

(d) a step of causing concurrently to display each of said plural groups of processing condition data stored in said memory on said display means, differently from the screen displayed by said step (a); and (e) a step of causing to select the processing conditions of the desired group from among said plural groups of processing condition data displayed on said display means. --.

Signed and Sealed this

Thirteenth day of November, 2001

*Attest:*

Nicholas P. Godici

NICHOLAS P. GODICI

*Attesting Officer* *Acting Director of the United States Patent and Trademark Office*